(12) United States Patent
Siemens et al.

(10) Patent No.: US 10,605,326 B2
(45) Date of Patent: Mar. 31, 2020

(54) ABSORBER SYSTEM WITH GUIDEWAYS AND METHOD FOR THE ARRANGEMENT OF GUIDEWAYS ON AN ABSORBER SYSTEM

(71) Applicant: ZF FRIEDRICHSHAFEN AG, Friedrichshafen (DE)

(72) Inventors: Kyrill Siemens, Würzburg (DE); Mathias Kopp, Bamberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 64 days.

(21) Appl. No.: 15/769,317

(22) PCT Filed: Sep. 26, 2016

(86) PCT No.: PCT/EP2016/072792
§ 371 (c)(1),
(2) Date: Apr. 18, 2018

(87) PCT Pub. No.: WO2017/067744
PCT Pub. Date: Apr. 27, 2017

(65) Prior Publication Data
US 2018/0313427 A1    Nov. 1, 2018

(30) Foreign Application Priority Data
Oct. 20, 2015 (DE) .......................... 10 2015 220 419

(51) Int. Cl.
*F16F 15/14* (2006.01)
(52) U.S. Cl.
CPC .................................. *F16F 15/145* (2013.01)

(58) Field of Classification Search
CPC ...... F16F 15/145; F16F 15/14; Y10T 74/2128
See application file for complete search history.

(56) References Cited

U.S. PATENT DOCUMENTS

| | | | |
|---|---|---|---|
| 9,243,681 B2 * | 1/2016 | Movlazada | ........... F16F 15/145 |
| 2013/0239746 A1 * | 9/2013 | Movlazada | ........... F16F 15/145 |
| | | | 74/574.2 |
| 2016/0195159 A1 * | 7/2016 | Takikawa | .............. F16F 15/145 |
| | | | 74/574.2 |

FOREIGN PATENT DOCUMENTS

| | | |
|---|---|---|
| DE | 10 2008 005 138 | 8/2008 |
| DE | 10 2011 009 484 | 8/2011 |
| DE | 10 2011 016 568 | 11/2011 |
| DE | 10 2011 085 400 | 5/2012 |
| DE | 10 2011 086 532 | 6/2012 |

(Continued)

*Primary Examiner* — Patrick Cicchino
(74) *Attorney, Agent, or Firm* — Cozen O'Connor

(57) ABSTRACT

A mass damper system with a damper mass carrier having guide paths for receiving damper masses. The guide paths initiate swiveling movement at the damper masses around a center of mass during deflection of the damper masses. String lengths of imaginary string pendulums predetermine a position of respective coupling element configure the guide paths and the path curve is based on a first radial portion that extends from a central axis of the damper mass carrier to a connection point of a second radial portion and the second radial portion extends from the first radial portion to the center of mass. A ratio value is formed from a swiveling angle of the damper mass and its oscillation angle. A coupling element position in relation to the string length is determined by this ratio value.

7 Claims, 9 Drawing Sheets

(56) References Cited

FOREIGN PATENT DOCUMENTS

DE   11 2013 006 159        8/2015
EP              2851579 A1 *  3/2015   ........ F16F 15/12313

* cited by examiner

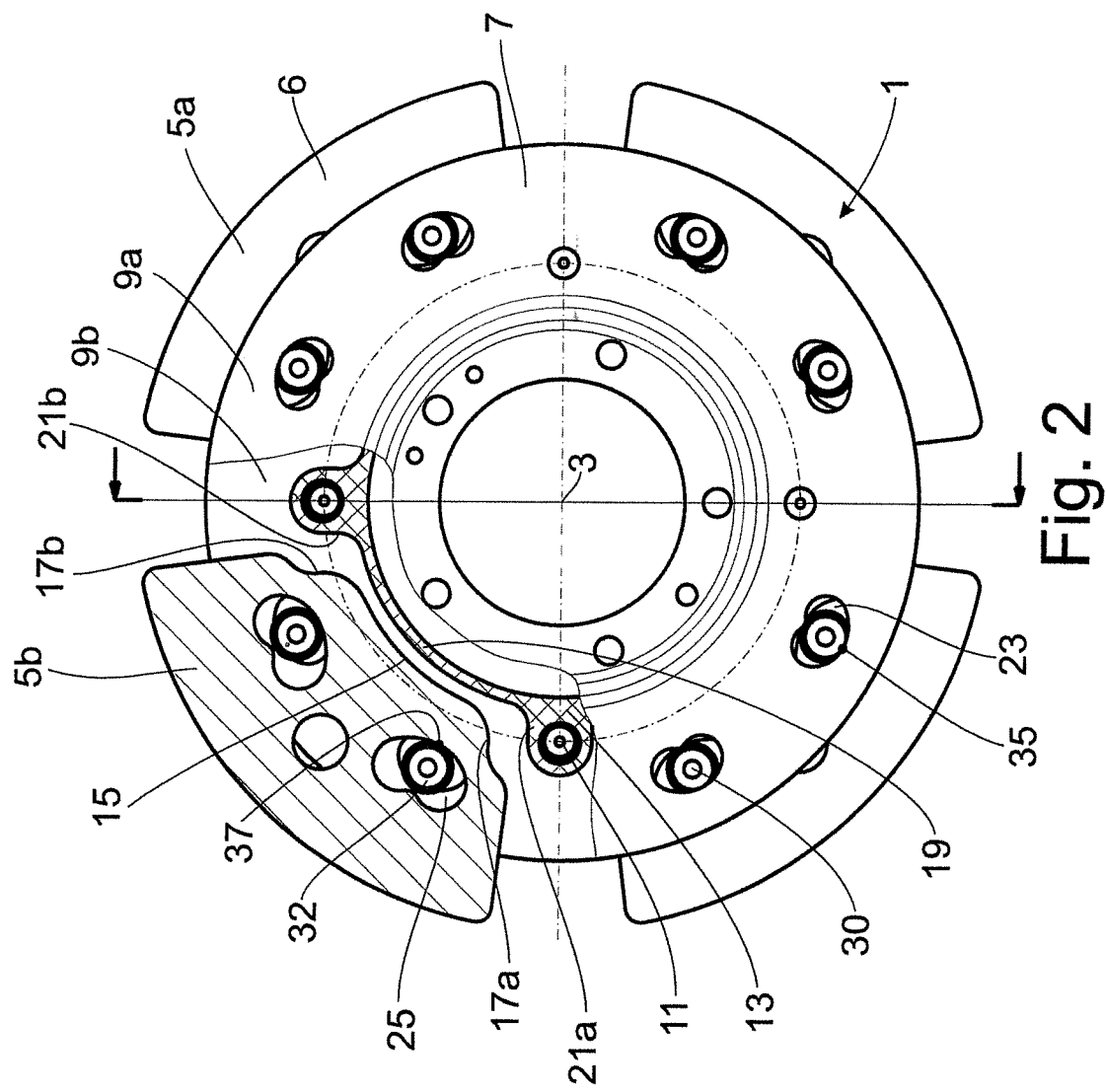
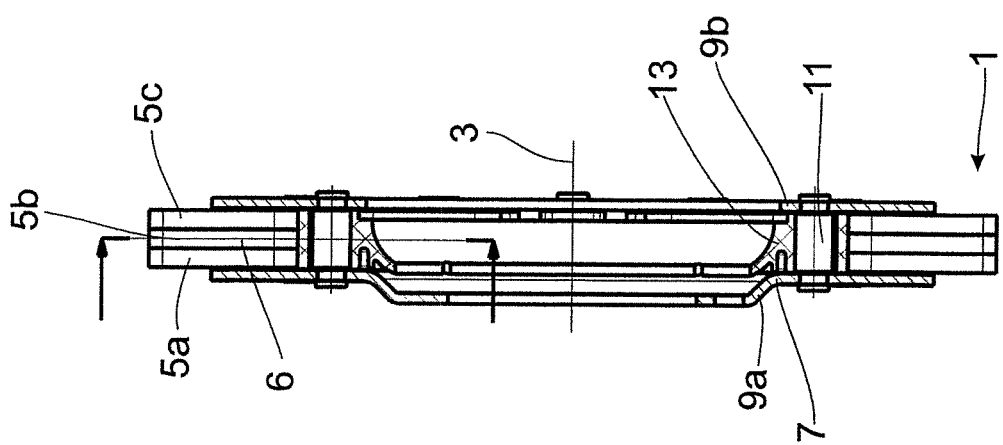

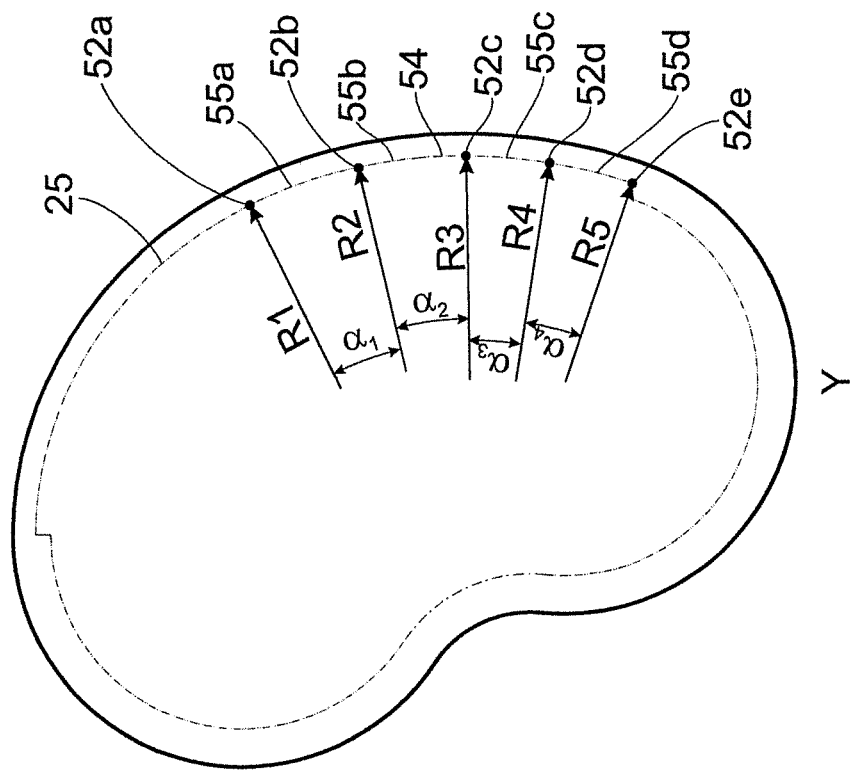
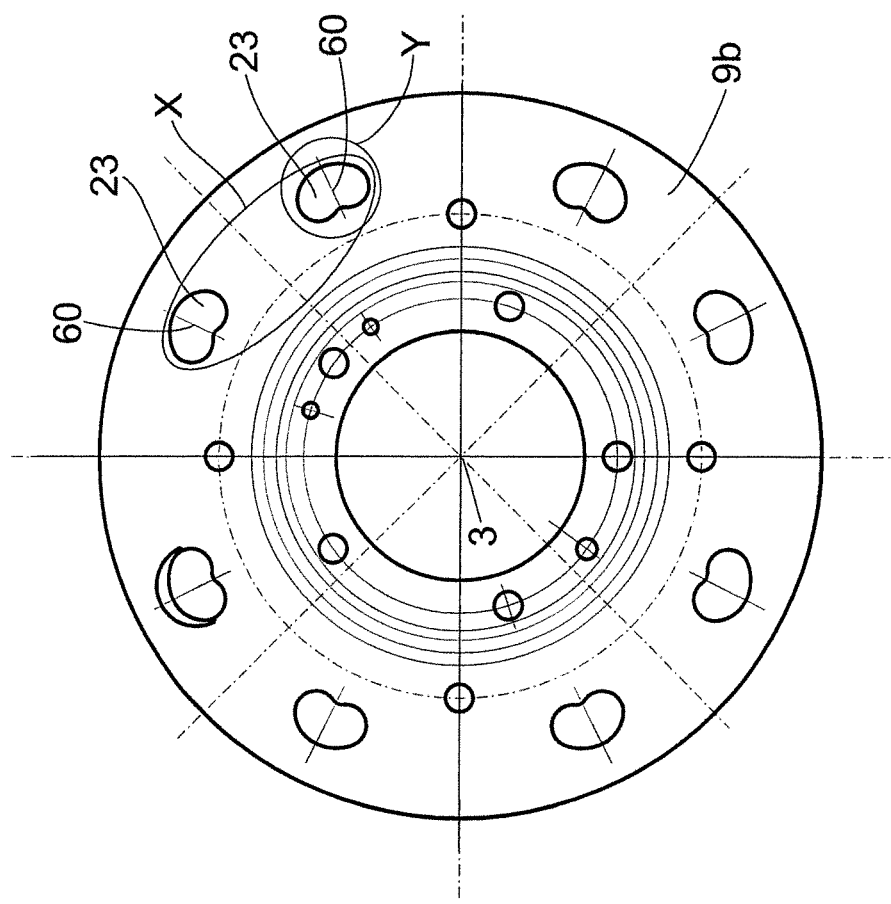

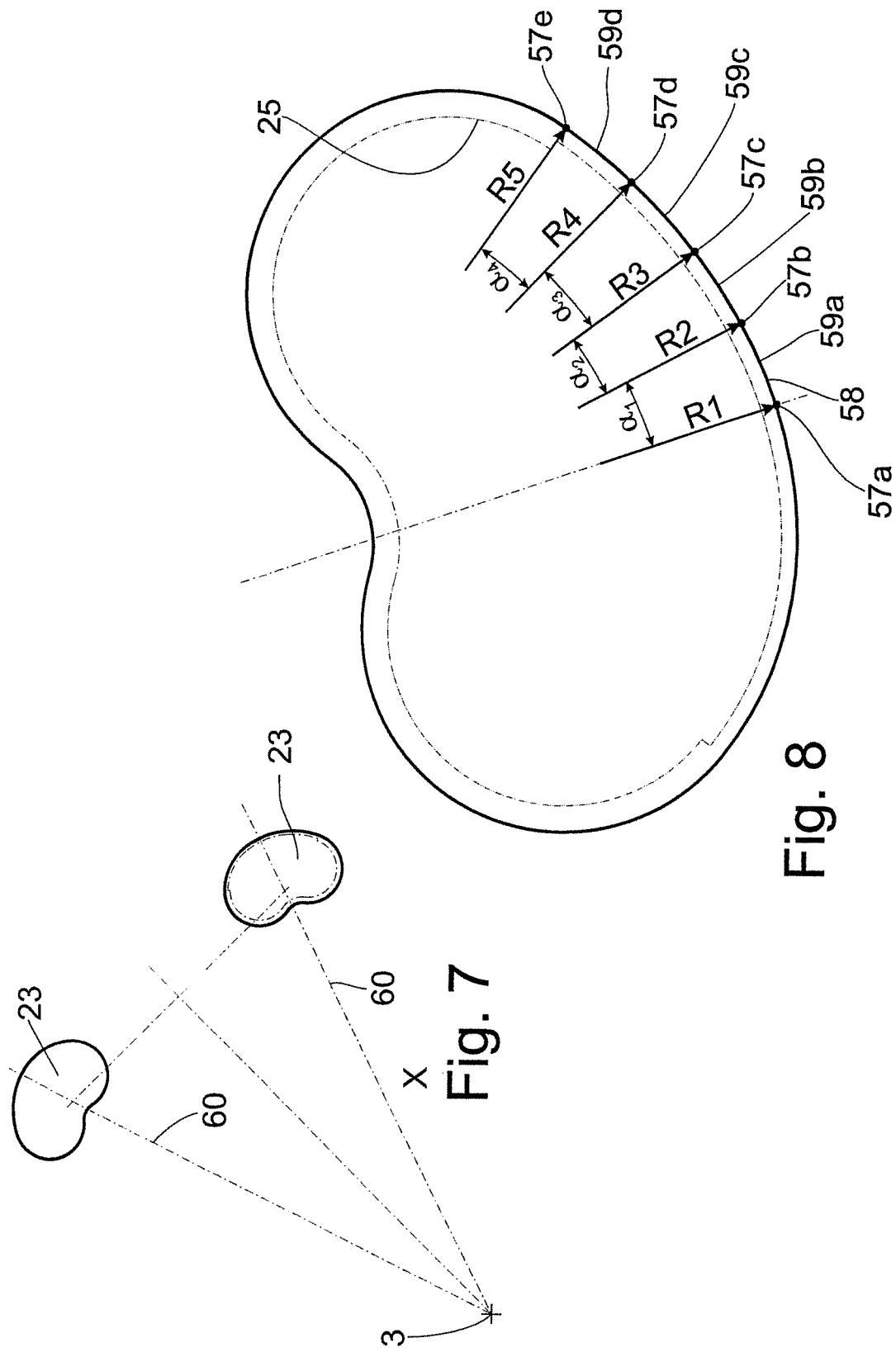

ABSORBER SYSTEM WITH GUIDEWAYS AND METHOD FOR THE ARRANGEMENT OF GUIDEWAYS ON AN ABSORBER SYSTEM

CROSS REFERENCE TO RELATED APPLICATIONS

This is a U.S. national stage of application No. PCT/EP2016/072792, filed on Sep. 26, 2016. Priority is claimed on German Application No. DE102015220419.7, filed Oct. 20, 2015, the content of which is incorporated here by reference.

BACKGROUND OF THE INVENTION

1. Field of the Invention

The invention is directed to a mass damper system with a damper mass carrier that has damper masses and that guide paths for receiving the damper masses, these guide paths being connected in each instance to guide paths of the damper masses by coupling elements. The guide paths of the damper mass carrier and the damper mass initiate a swiveling movement at the respective damper mass by a swiveling angle around a center of mass when the damper masses are deflected by a deflection angle from an initial position under centrifugal force. The geometric configuration of the guide paths and the geometric configuration of a path curve of the center of mass of the respective damper mass are carried out in association with one another. String lengths of imaginary string pendulums, which result during the deflection of the respective damper mass from the initial position by a deflection angle and which predetermine the position of the respective coupling element in each instance, are made use of for the geometric configuration of the guide paths, while the geometric configuration of the path curve of the center of mass of the respective damper mass is carried out based on two imaginary radial portions, there being associated with the first radial portion an extension length from a central axis of the damper mass carrier to a connection point of the second radial portion, and the first radial portion executes movements along an oscillation angle of the respective damper mass around the central axis, while an extension length from the connection point at the first radial portion to the center of mass of the respective damper mass is associated with the second radial portion, and the second radial portion executes movements along a deflection angle around the connection point at the first radial portion. The invention is further directed to a method for configuring the geometry of guide paths at a damper mass carrier of a mass damper system which serves to receive damper masses, wherein the guide paths of the damper mass carrier and damper mass operatively communicate with one another in each instance by the coupling elements.

2. Description of the Prior Art

A mass damper system of this type is known from DE 10 2011 086 532 A1. In this mass damper system, the damper mass carrier is capable of executing rotational movements around its central axis, while the damper masses execute displacement movements in relation to the damper mass carrier by the coupling elements as soon as torsional vibrations of a drive are transmitted to the mass damper system. During these displacement movements, a swiveling movement of the damper masses around their center of mass is superposed on a movement of the damper masses which is translational per se. This results in a total movement in which the damper masses can preferably follow the shape of an installation space intended to receive the mass damper system. This advantageous sequence of movements allows damper masses of considerable inertia even in compact installation spaces. However, these advantages notwithstanding, the configuration of the geometry of the guide paths of damper mass carrier and damper masses is very costly, especially since the respective coupling element is to be guided in the guide path in a trouble-free manner.

SUMMARY OF THE INVENTION

It is an object of one aspect of the invention to provide an advantageous configuration of the geometry of the guide paths in the damper mass carrier and damper masses in a simple manner.

A mass damper system is provided with a damper mass carrier that has damper masses and guide paths for receiving the damper masses, these guide paths being connected in each instance to guide paths of the damper masses by coupling elements. The guide paths of damper mass carrier and damper mass initiate a swiveling movement at the respective damper mass by a swiveling angle around a center of mass when the damper masses are deflected by a deflection angle from an initial position occupied under centrifugal force. The geometric configuration of the guide paths and the geometric configuration of a path curve of the center of mass of the respective damper mass are carried out in association with one another. String lengths of imaginary string pendulums that result during deflection of the respective damper mass from the initial position by a deflection angle and which predetermine the position of the respective coupling element in each instance are made use of for the geometric configuration of the guide paths, while the geometric configuration of the path curve of the center of mass of the respective damper mass is carried out based on two imaginary radial portions, there being associated with the first radial portion an extension length from a central axis of the damper mass carrier to a connection point of the second radial portion, and the first radial portion executes movements along an oscillation angle of the respective damper mass around the central axis, while an extension length from the connection point at the first radial portion to the center of mass of the respective damper mass is associated with the second radial portion, and the second radial portion executes movements along a deflection angle around the connection point at the first radial portion.

In this regard, it is especially important that after specifying a ratio value diverging from zero, which is determined from the swiveling angle of the respective damper mass in relation to its oscillation angle, the position of the respective coupling element in relation to the string length of the imaginary string pendulum associated with this coupling element is determined by selecting that location along the string length at which, on the one hand, the position of this coupling element at the respective imaginary string pendulum remains unchanged over the deflection angle and at which, on the other hand, contact forces acting between the coupling elements and the guide paths of damper mass carrier and damper masses are directed toward one another independent from the respective deflection angle in order, in this way, to obtain a plurality of path points for the guide paths in damper mass carrier and damper masses, which path points differ from one another with respect to their radii and, by connecting to one another, serve to form a polygonal chain by means of path curve segments which are strung together.

Through the foregoing procedure in configuring the guide paths, steps are taken that directly influence the respective movement behavior of the damper masses. In this way, through a few configuration steps that may possibly be applied iteratively, the guide paths of damper mass carrier and damper masses can be formed such that a swiveling movement around the respective center of mass is superposed on the movement of the damper masses which is translational per se.

The swiveling movement of the damper masses around their respective center of mass is preferably selected by determining a ratio value $\kappa_\varphi$ from a swiveling angle δ of the damper mass around its center of mass in relation to the oscillation angle φ associated with the translational movement of the damper mass. Through an apt selection of the ratio value $\kappa_\varphi$, the damper masses can be aligned in each instance within the predefined, usually annular, installation space such that its outer areas and inner areas stay free of contact with the installation space surrounding them. Accordingly, no corrections need be made in this respect at the damper masses to reduce outer areas or inner areas. Since corrections of this type at the damper masses would be carried out through removal of material at least from edge areas, this would result in reduced inertia because of the weight subtracted, namely in particular when removing material in the outer areas. In addition to this, the removal of material in the outer area of a damper mass would cause the center of mass to be shifted radially inward.

Through application of the above-mentioned configuration steps, possibly iteratively, to the guide paths of damper mass carrier and damper masses, these guide paths are formed with a plurality of path points which differ from one another with respect to their radii and which, through connecting to one another, serve to form a polygonal chain by strung-together path curve segments. In this way, the respective guide path is formed in such a way at each point of its extension that there is a smooth movement sequence of the respective coupling element in the associated guide path in spite of the swiveling movement of the damper masses around their center of mass. Of course, the necessary condition for this is met, i.e., to determine the position of this coupling element in relation to the extension length of the imaginary string pendulum associated with this coupling element at which, on the one hand, the position of this coupling element in relation to the extension length of this string pendulum remains constant over the deflection angle and, on the other hand, the contact forces between the coupling element and the guide path of damper mass carrier and damper masses are directed toward one another at every deflection angle.

Reference has already been made to the effect of the ratio value $\kappa_\varphi$. When a ratio value $\kappa_\varphi$ in the amount of 1 is implemented, the guide paths in the damper mass carrier and in the damper masses are aligned with respect to damper mass carrier and damper masses in such a way that their centerlines respectively cross the central axis of the damper mass carrier. In contrast, when a ratio value $\kappa_\varphi$ which is not equal to 1 but is greater than zero is realized the guide paths in damper mass carrier and in damper masses are aligned with respect to the damper mass carrier and damper masses in such a way that their centerlines miss the central axis of the damper mass carrier in each instance.

An advantage in implementing a ratio value $\kappa_\varphi$ not equal to zero is a reduced path curve of the center of mass of the respective damper mass and, therefore, of the guide paths in the damper mass carrier and damper mass. On the one hand, this results in a reduced area pressure in the damper mass carrier and damper mass, particularly when the ratio value is not equal to 1, and, on the other hand, in an appreciably lower order decay over the oscillation angle.

BRIEF DESCRIPTION OF THE DRAWINGS

The invention will be described in the following with reference to embodiment examples. In particular, the drawings show:

FIG. 1 is a damper mass system with damper masses received at a damper mass carrier;

FIG. 2 is a top view of the mass damper system in partial section along line B-B in FIG. 1;

FIG. 5 is a top view of a damper mass carrier with centerlines of the guide paths aligned with a central axis of the damper mass carrier;

FIG. 6 is an enlarged view of a guide path of the damper mass carrier from FIG. 5 to illustrate path curve segments of a polygonal chain;

FIG. 7 is an enlarged view of two guide paths of the damper mass carrier from FIG. 5 to illustrate the alignment of the centerlines of the guide paths with the central axis of the damper mass carrier;

FIG. 8 is an enlarged view of a guide path of a damper mass to show path curve segments of a polygonal chain;

DETAILED DESCRIPTION OF THE PRESENTLY PREFERRED EMBODIMENTS

Figure 3:
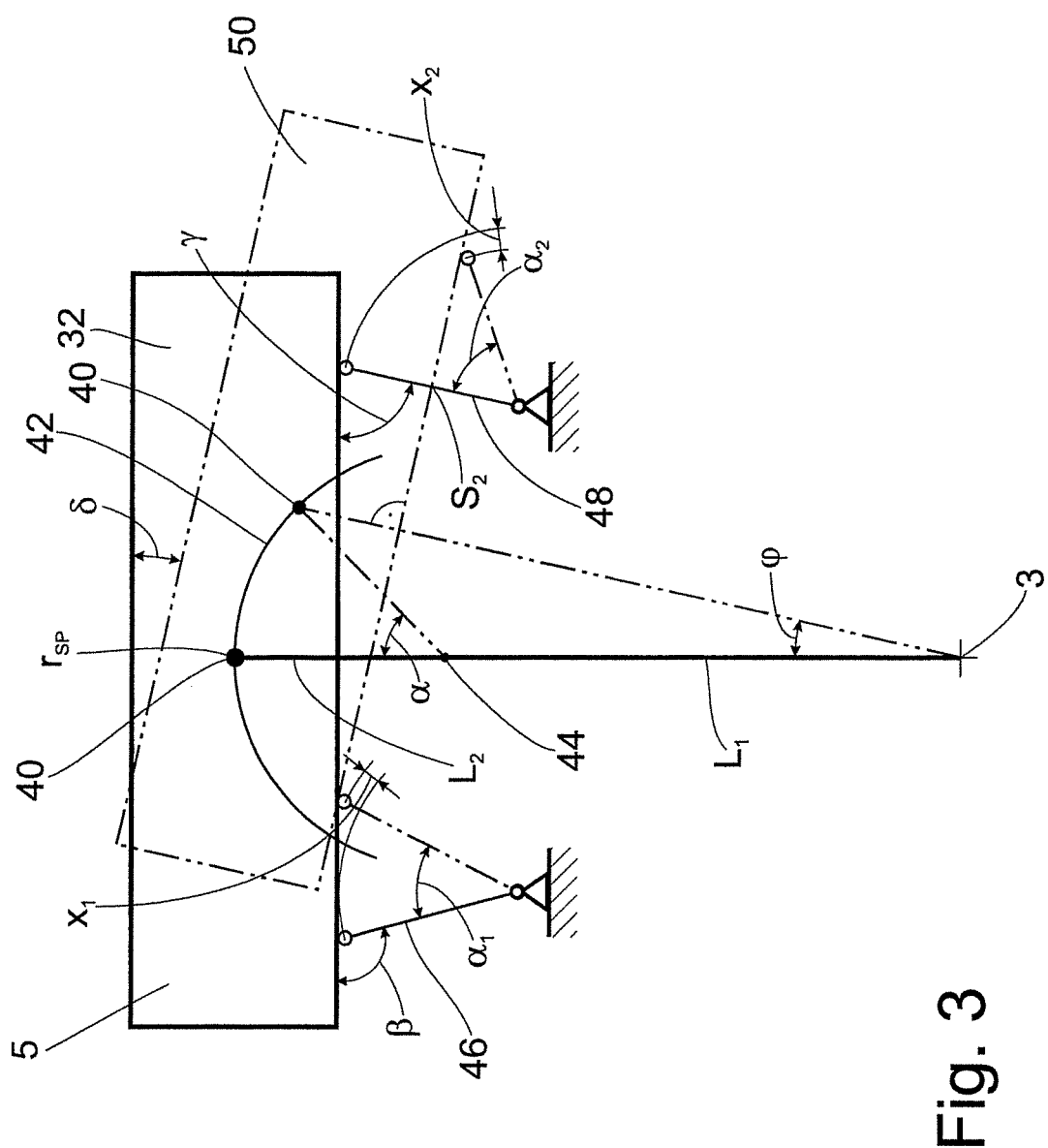
FIG. 3 is a schematic view of a damper mass during a deflection movement for configuring guide paths at damper mass carrier and damper masses.

FIGS. 1 and 2 show a mass damper system 1 which is rotatable around a central axis 3. To receive damper masses 5a, 5b, 5c of a damper mass unit 6, the mass damper system 1 has a damper mass carrier 7 with two damper mass carrier elements 9a, 9b arranged parallel to one another so as to be spaced apart from one another and which receive axially therebetween the respective damper masses 5a, 5b, 5c and are fixedly connected to one another by spacers 11. The spacers 11 further receive a substantially annular stop 13 for the damper masses 5a, 5b, 5c. Depending on the operating situation, damper masses 5a, 5b, 5c come in contact with outside stop elements 19 of the stop 13 either by their radial inner sides 15 or come in contact with circumferential stop elements 21a, 21b of stop 13 by their circumferential ends 17a, 17b.

The damper mass carrier elements 9a, 9b have two guide paths 23 for each damper mass 5a, 5b, 5c and, therefore, for each damper mass unit 6, and the damper mass 5a, 5b, 5c of the respective damper mass unit 6 also has two guide paths 25 in each instance. Guide paths 23 and 25 are connected to one another by coupling elements 30. These coupling elements 30 are at least substantially cylinder-shaped and, as far as possible, should roll in the guide paths 23 and 25.

In an operating condition in which the damper mass carrier elements 9a, 9b execute a rotational movement around the central axis 3 at a rate of rotation at which the centrifugal force at the damper masses 5a, 5b, 5c exceeds the weight force, the coupling elements 30 occupy an initial position 32 in the guide paths 23 and 25 shown in FIG. 2. The coupling elements 30 are in this initial position 32 at that point 35 on the guide paths 23 of the damper mass carrier elements 9a, 9b which has the greatest radial distance from the central axis 3. As for damper masses 5a, 5b, 5c, the coupling elements 30 assume their respective initial position 32 at those points 37 on the guide paths 25 in which there is the shortest radial distance from the central axis 3.

Torsional vibrations introduced into the damper mass carrier 7 cause the damper masses 5a, 5b, 5c to be deflected from their respective initial position 32 in the guide paths 23 and 25 against the effect of the centrifugal force that accordingly also acts as a restoring force in direction of the respective initial position 32. The respective movement of the damper masses 5a, 5b, 5c during this deflection movement around the central axis 3 over an oscillation angle $\varphi$ shown in FIG. 3 depends, inter alia, on the swiveling angle $\delta$ by which the damper mass 5a, 5b, 5c executes a rotational movement around a center of mass 40. The path curve 42 completed during this movement of the center of mass 40 is shown in FIG. 3 referring to a schematically shown damper mass 5. The center of mass 40 moves along the path curve 42 depending on a deflection angle $\alpha$, specifically, in a configuration in which a ratio value $\kappa_\varphi$ formed from the swiveling angle $\delta$ in relation to the oscillation angle $\varphi$ assumes the value of 1, so that:

$$\kappa_\varphi = \delta/\varphi = 1.$$

As is shown in FIG. 3, the model of a string pendulum is utilized in the configuration of the mass damper system 1 discussed above. Accordingly, FIG. 3 shows two imaginary string pendulums 46, 48; the first string pendulum 46 is formed with a string length $S_1$ and the second string pendulum 48 is formed with a string length $S_2$, where strings lengths $S_1$ and $S_2$ differ from one another. The first string pendulum 46 acts in the initial position 32 of the damper mass 5 at an angle $\beta$, while the second string pendulum 48 acts at an angle $\gamma$. During the movement of the damper mass 5 from its initial position 32 into its deflection position 50 shown in FIG. 3, the first string pendulum 46 is displaced by angle $\alpha_1$, while the second string pendulum 48 is displaced by angle $\alpha_2$.

As is further shown in FIG. 3, the first radial portion $L_1$ has an extension length from the central axis 3 to the connection point 44 of the second radial portion $L_2$, while an extension length from the connection point 44 at the first radial portion $L_1$ to the center of mass 40 of the damper mass 5 is associated with the second radial portion $L_2$. Accordingly, in the initial position 32 of the damper mass 5, the radius $r_{SP}$ by which the center of mass 40 is distanced from the central axis 3 is given by adding the lengths of the first radial portion $L_1$ and second radial portion $L_2$. During the deflection of the damper mass 5 shown in FIG. 3, the center of mass 40 of damper mass 5 executes the deflection movement along path curve 42, the first radial portion $L_1$ being deflected relative to the central axis 3 by oscillation angle $\varphi$, whereas the second radial portion $L_2$ is deflected by a deflection angle $\alpha$ around the connection point 44 on the first radial portion $L_1$.

The extension length for the second radial portion $L_2$ is determined as follows:

$$L_2 = \frac{r_{SP} + \sqrt{\dfrac{m_{damper} * \text{order}^2 * r_{SP}^2 - 4 * J_{damper} * \text{order}^2 * k_\varphi^2 + m_{damper} * r_{SP}^2}{m_{damper} * \text{order}^2 + m_{damper}}}}{2 * \text{order}^2 + 2}$$

The weight $m_{damper}$ of the damper mass 5, radius $r_{SP}$ of the center of mass 40 of damper mass 5 around central axis 3, inertia $J_{damper}$ of damper mass 5, and the order on which the mass damper system 1 is to be designed are needed to determine the extension length for the radial portion $L_2$. The ratio value $\kappa_\varphi$ must also be specified.

There is the following relationship between radial portions $L_1$ and $L_2$:

$$L_1 = r_{SP} - L_2.$$

The extension length for radial portion $L_1$ can also be determined in this way.

Figure 4:
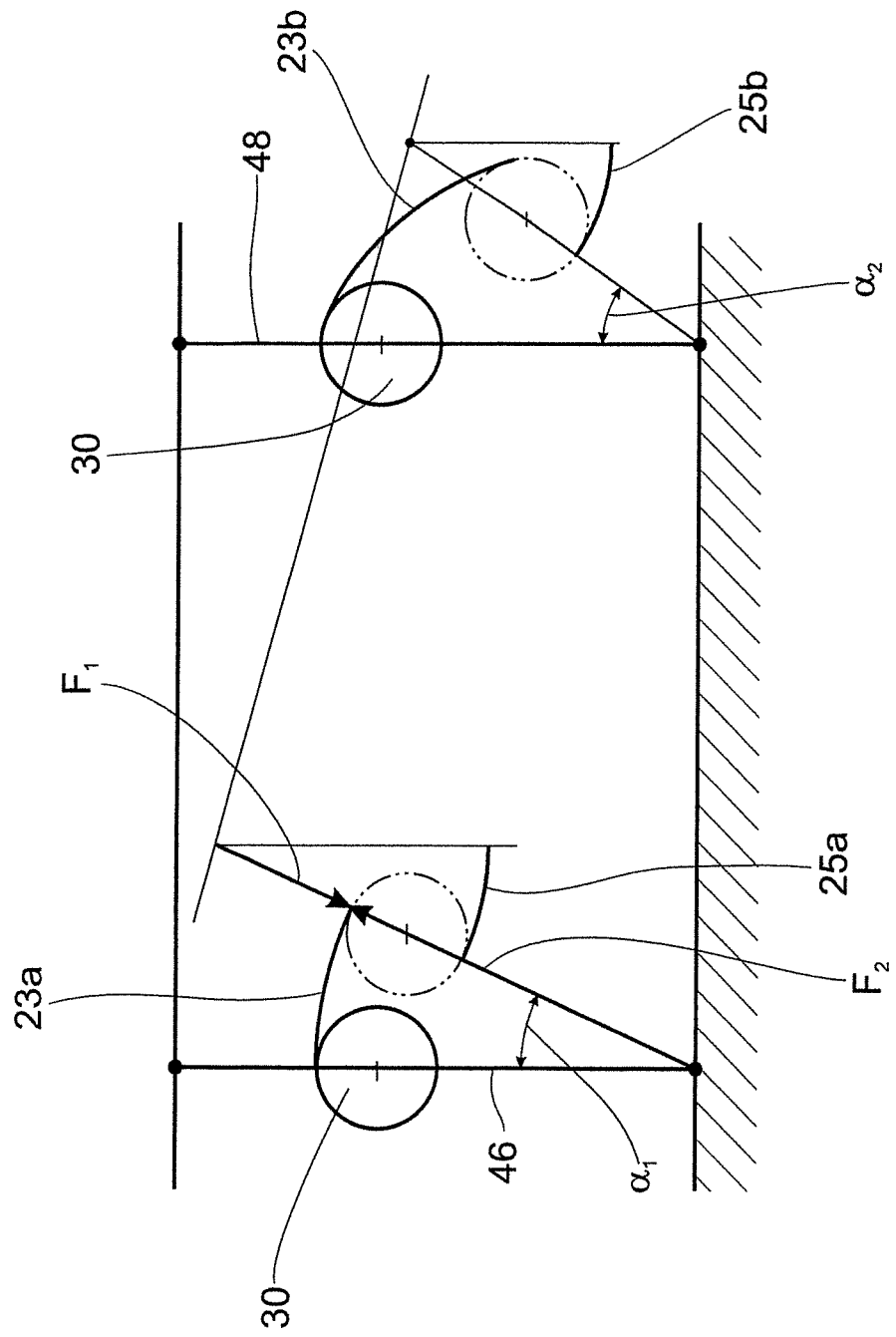
FIG. 4 is a schematic view of the guide paths at damper mass carrier and damper masses and of coupling elements connected to one another by the guide paths.

The imaginary string pendulums 46, 48 are used to determine the geometry of the guide paths 23 in the damper mass carrier elements 9a, 9b and the geometry of the guide paths 25 in the damper masses 5 or 5a, 5b, 5c. With these string pendulums 46, 48, a variation in the respective length must be carried out corresponding to the respective deflection angle $\alpha_1$, $\alpha_2$ in order to ensure that the center of mass 40 of the respective damper mass 5 follows the path curve 42. As can be seen in particular from FIG. 3, the string pendulum 46 must be lengthened for this purpose by amount $x_1$, while string pendulum 48 must be shortened by amount $x_2$. Accordingly, placement of the coupling elements 30 at the string pendulums 46, 48 in the middle in extension direction is out of the question. Instead, the selected position of the respective coupling element 30 along the extension direction of the string pendulums 46, 48 must be off center, as a consequence of which the resulting guide paths 23, 25 are unequal with respect to path length and path curvature. FIG. 4 shows a coupling element 30 at the string pendulums 46, 48 in connection with guide paths 23a, 25a or 23b, 25b. It is clearly shown that the guide paths 23b, 25b at string pendulum 48 appreciably differ from guide paths 23a, 25a at string pendulum 46 with respect to their orientation and shape.

In this type of configuration of the guide paths 23a, 25a or 23b, 25b, it must be ensured that the contact forces $F_1$, $F_2$ between the respective coupling element 30 and the guide paths 23, 23a, 23b in the damper mass carrier elements 9a, 9b or the guide paths 25, 25a, 25b in the damper masses 5a, 5b, 5c are ideally exactly directed toward one another at every deflection angle $\alpha_1$, $\alpha_2$ because only then will a trouble-free rolling of the coupling element 30 in the respective guide path 23, 25, 23a, 25a, 23b, 25b be ensured.

The foregoing considerations are based on coupling elements 30 that are not stepped. In case of stepped coupling elements 30, the transmission ratio brought about by the gradation changes due to the above-mentioned configuration of the guide paths 23, 25, 23a, 25a, 23b, 25b.

For configuring guide paths 23, 25 as is shown in FIG. 6 for a guide path 23 at the damper mass carrier element 9a, 9b and in FIG. 8 for a guide path 25 at the damper mass 5a, 5b, 5c, individual path points 52a to 52e (FIG. 6) or individual path points 57a to 57e (FIG. 8) with radii R1, R2, R3, R4, R5 are selected in accordance with the proportioning of the respective coupling element 30 in association with predetermined deflection angles $\alpha_1$ to $\alpha_4$ and are subsequently connected to form a polygonal chain 54 (FIG. 6) or a polygonal chain 58 (FIG. 8). Guide paths 23 (FIG. 6) or guide paths 25 (FIG. 8) in which different path curve segments 55a to 55d (FIG. 6) or different path curve segments 59a to 59d (FIG. 8) are connected to one another are generated in this way. Other than that, as is shown by way of example in FIG. 5 or FIG. 7 for guide paths 23, guide paths 23, 25 are aligned such that their centerlines 60 run through the central axis 3 of the mass damper system 1. Of course, this assumes that an amount 1 is selected for the ratio value $\kappa_\varphi$.

Figure 9:
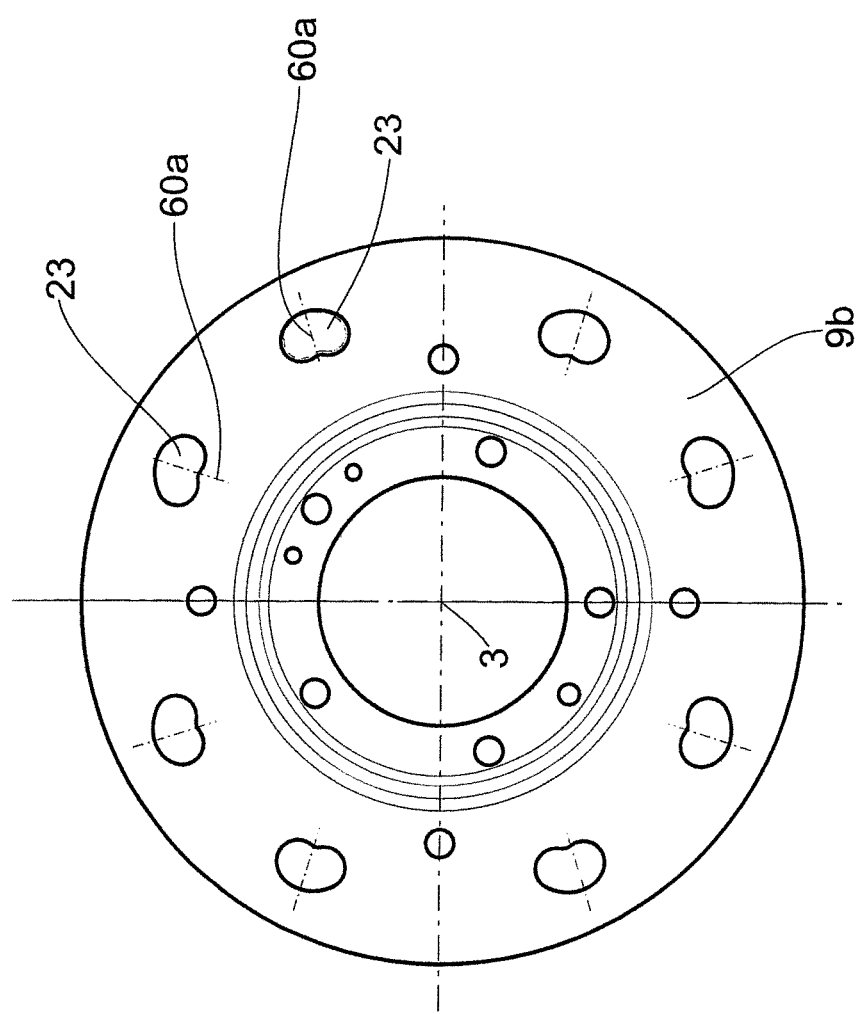
FIG. 9 is the same as FIG. 6, with centerlines of the guide paths oriented relative to the central axis of the damper mass carrier such that the central axis is not crossed.

If the configuration of the guide paths 23, 25 is carried out with a ratio value $\kappa_\varphi$ of 1.5, then the swiveling angle $\varepsilon$ is greater than the oscillation angle 5. The guide paths 23 in the damper mass carrier elements 9a, 9b are then rotated like guide paths 25 in damper masses 5a, 5b, 5c such that their centerlines 60a do not meet the central axis 3. Referring to a damper mass carrier element 9d by way of example, FIG. 9 shows how its guide paths 23 are oriented at a ratio value $\kappa_\varphi$ of 1.5.

When the guide paths 23, 25 are configured with a ratio value $\kappa_\varphi$ which is not equal to zero, the moment of inertia $J_{damper}$ manifests itself reductively with respect to the order so that, compared with guide paths 23, 25 which are configured with a ratio value $\kappa_\varphi$ equal to zero, an appreciably shorter path curve 42 is needed for the center of mass 40 of the damper mass 5, 5a, 5b, 5c to arrive at the same order. The sharper the increase in the ratio value $\kappa_\varphi$, the more this consequence becomes noticeable. This is shown by the following formula:

$$L_2 = \frac{r_{SP}}{1 + \text{target order}^2}$$

$$L_1 = r_{SP} - L_2$$

$$\text{Order} = \sqrt{\frac{L_1 * L_2 * m_{damper}}{m_{damper} * L_2^2 + \left(\frac{k_\varphi}{1 + \text{target order}^2}\right)^2 * J_{damper}}}$$

To determine the actual order, it is necessary to specify the weight $m_{damper}$ of the damper mass 5, the radius $r_{SP}$ of the center of mass 40 of the damper mass 5 around the central axis 3, the inertia $J_{damper}$ of the damper mass 5 and the order on which the mass damper system 1 is to be configured. The ratio value $\kappa_\varphi$ is to be specified also. As soon as these values are entered in the formula above, the actual order is seen to be appreciably lower than the predetermined target order in terms of amount.

Figure 10:
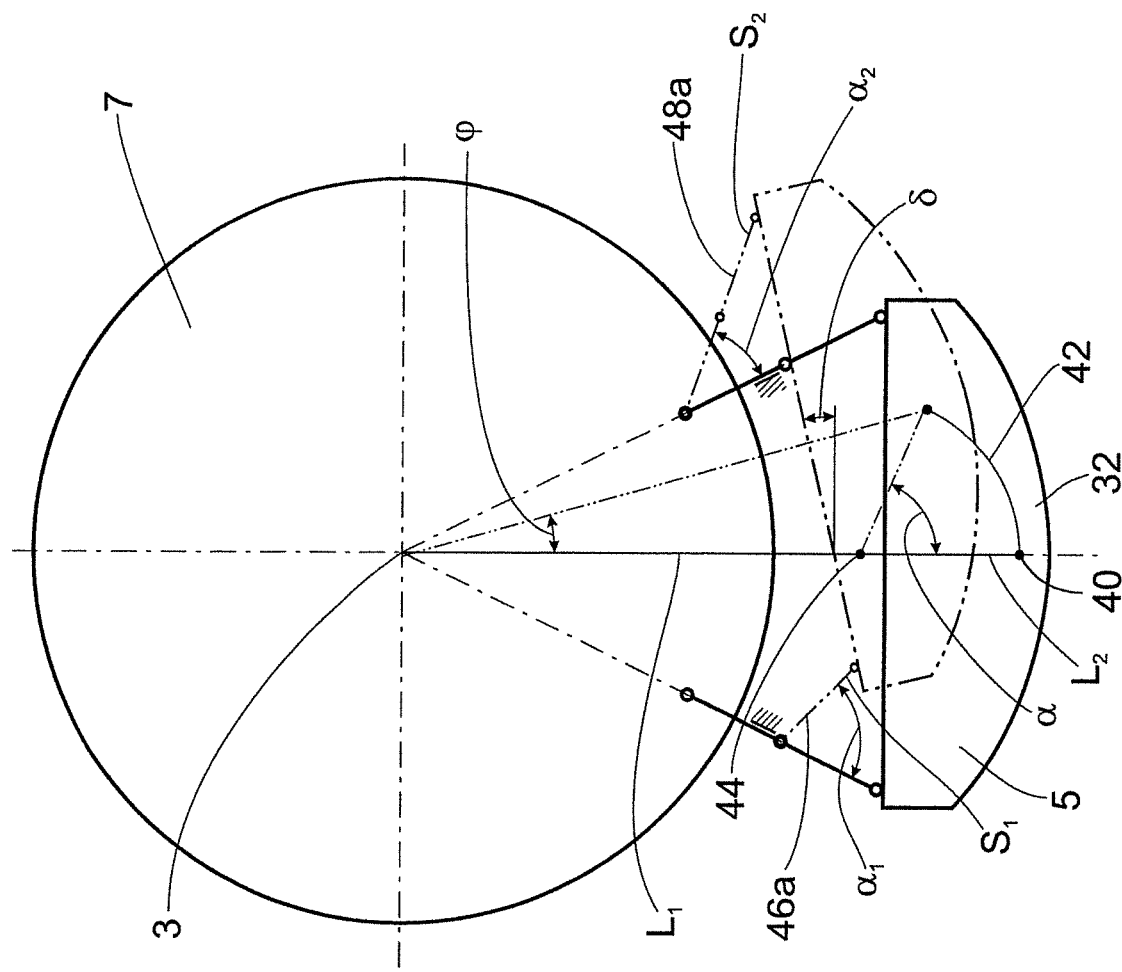
FIG. 10 is the same as FIG. 3, with the guide paths configured in a different way.
Figure 11:
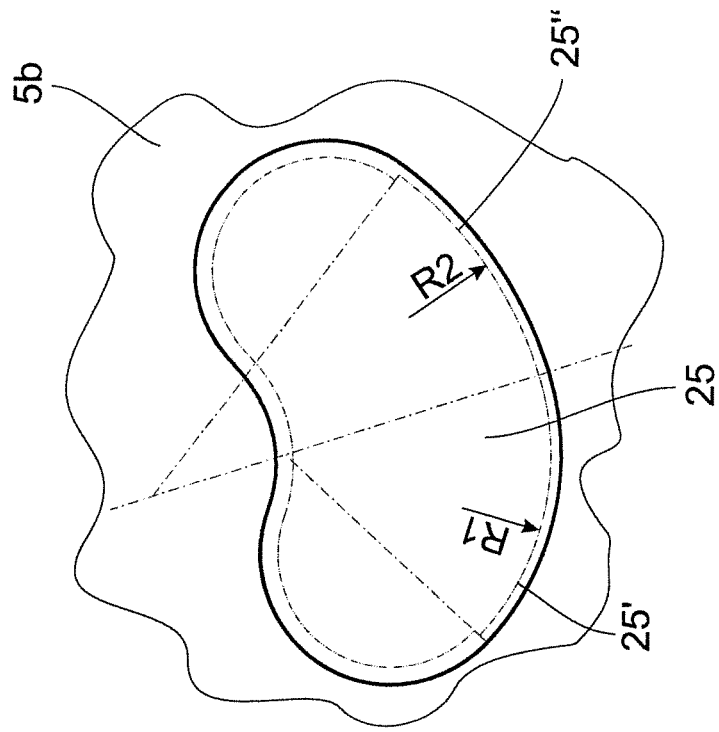
FIG. 11 is the same as FIG. 6, with the configuration of the guide path of a damper mass carrier by means of circle segments.
Figure 12:
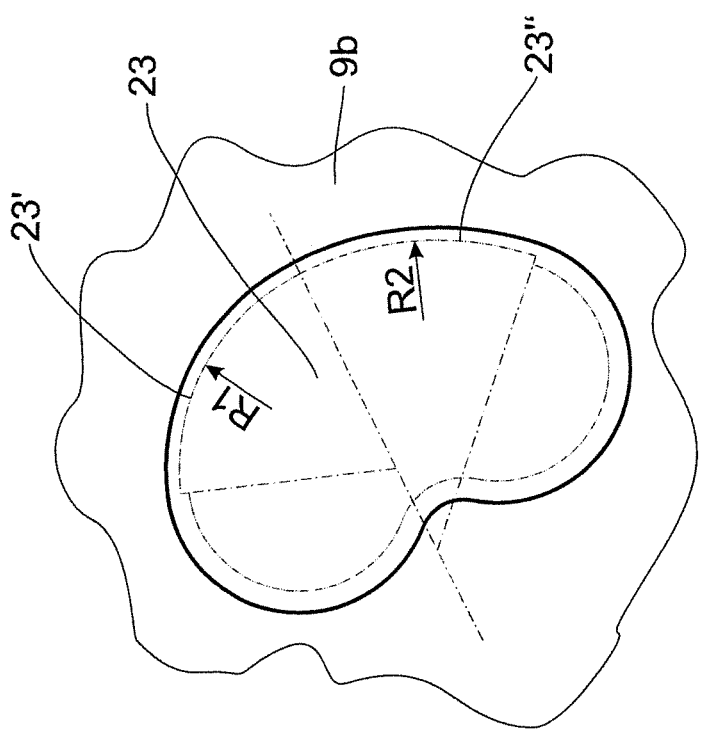
FIG. 12 is the same as FIG. 11, with the guide path of a damper mass.
Figure 14:
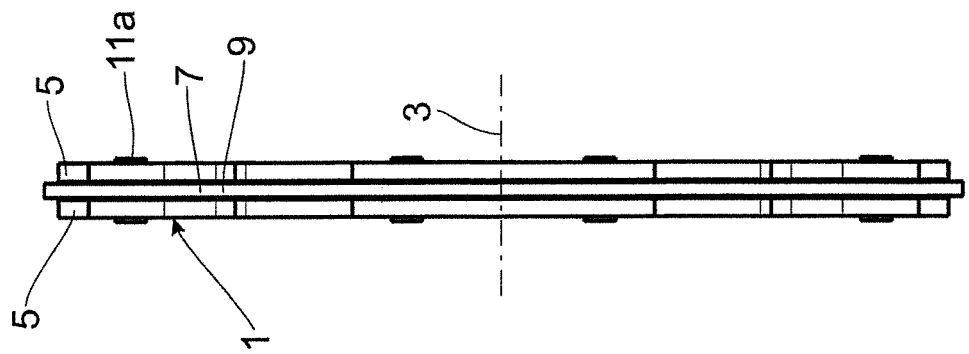
FIG. 14 is an illustration of the mass damper system from viewing direction B in FIG. 13.

FIGS. 10 to 12 show a further possibility for configuring a mass damper system 1. The aim in this case is to guide the center of mass 40 of a damper mass 5 along a defined path curve 42. In order to realize this, the guide paths 23, 25 in the damper mass carrier elements 9a, 9b of the damper mass carrier 7 and in the damper masses 5, 5a, 5b, 5c are executed as a composite circular path. As is shown in particular in FIG. 11 for a damper mass carrier element 9b and in FIG. 12 for a damper mass 5b, each guide path 23, 25 of damper mass carrier elements 9a, 9b and of damper masses 5, 5a, 5b, 5c is preferably formed of two different circle segments 23', 23", 25', 25" with radii R1 and R2. As has already been demonstrated in the foregoing description, the swiveling movement of the damper masses 5, 5a, 5b, 5c around their respective center of mass 40 is realized by varying the lengths $S_1$ and $S_2$ of imaginary string pendulums 46a, 48a during the deflection from the deflection position 32 over a deflection angle $\alpha_1$, $\alpha_2$. The circle segments 23', 23", 25', 25" are configured in such a way that the course of the path curve 42 of the center of mass 40 of the damper masses 5, 5a, 5b, 5c corresponds at least substantially to the course of a target path curve.

As regards the path curve 42 of the center of mass 40 of damper masses 5, 5a, 5b, 5c, it is noted that this path curve 42 can be described by the two imaginary radial portions $L_1$, $L_2$, and an extension length from the central axis 3 of the damper mass carrier 7 to a connection point 44 of the second radial portion $L_2$ is associated with the first radial portion $L_1$, and the first radial portion $L_1$ executes movements along an oscillation angle $\varphi$ of the respective damper mass 5; 5a, 5b, 5c around the central axis 3, while an extension length from the connection point 44 at the first radial portion $L_1$ to the center of mass 40 of the respective damper mass 5; 5a, 5b, 5c is associated with the second radial portion $L_2$, and the second radial portion $L_2$ executes movements along a deflection angle $\alpha$ around the connection point 44 at the first radial portion $L_1$.

Figure 13:
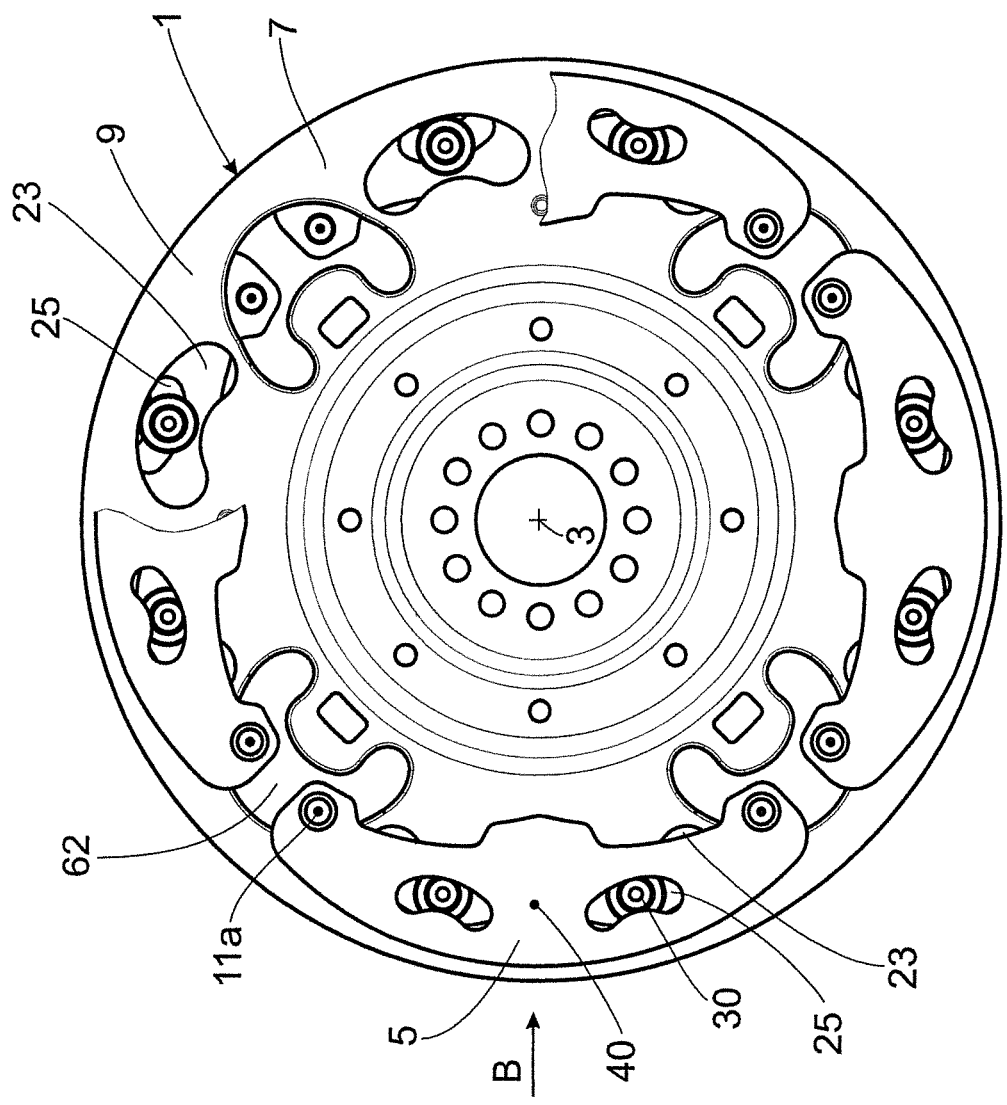
FIG. 13 is the same as FIG. 1, with a different constructional layout of the mass damper system.

In contrast to the arrangement of the mass damper system according to FIGS. 1 and 2, FIGS. 13 and 14 show a damper mass system 1 in which damper masses 5 are arranged on both sides of an individual damper mass carrier element 9 of a damper mass carrier 7. The two damper masses 5 are fastened to one another by spacers 11a. In order to allow the damper masses 5 to carry out the required movement relative to the damper mass carrier element 9 and, therefore, relative to the damper mass carrier 7, the spacers 11a pass through recesses 62 in the damper mass carrier 7. In this construction too, guide paths 23 of the damper mass carrier 7 and guide paths 25 of damper masses 5 are operatively connected to one another by means of coupling elements 30. FIG. 13 also shows the center of mass 40 of damper masses 5 and the central axis 3 of the mass damper system 1. As concerns the configuration of guide paths 23, 25 of damper mass carrier 7 and damper masses 5, the steps described with reference to the construction shown in FIGS. 1 and 2 can also be transferred to the construction according to FIGS. 13 and 14.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. A mass damper system comprising:
damper masses having guide paths;
coupling elements;

a damper mass carrier that has guide paths that receive the damper masses, the guide paths being connected in each instance to the guide paths of the damper masses by the coupling elements, wherein the guide paths of the damper mass carrier and the damper masses initiate a swiveling movement at a respective damper mass by a swiveling angle around a center of mass of each respective damper mass when the damper masses are deflected by a deflection angle from an initial position due to centrifugal force, wherein a geometric configuration of the guide paths and a geometric configuration of a path curve of the center of mass of the respective damper mass are carried out in association with one another, wherein string lengths of imaginary string pendulums which result during the deflection of the respective damper mass from the initial position by a deflection angle and which predetermine the position of the respective coupling element in each instance are made use of for the geometric configuration of the guide paths, wherein the geometric configuration of the path curve of the center of mass of the respective damper mass is based on two imaginary radial portions, there being associated with the first radial portion an extension length from a central axis of the damper mass carrier to a connection point of the second radial portion, and the first radial portion executes movements along an oscillation angle of the respective damper mass around the central axis, while an extension length from the connection point at the first radial portion to the center of mass of the respective damper mass is associated with the second radial portion, and the second radial portion executes movements along a deflection angle around the connection point at the first radial portion, wherein after specifying a ratio value diverging from zero, which is determined from the swiveling angle of the respective damper mass in relation to its oscillation angle, a position of the respective coupling element in relation to the string length of the imaginary string pendulum associated with this coupling element is determined by selecting that location along the string length at which the position of the coupling element at the respective imaginary string pendulum remains unchanged over the deflection angle and at which contact forces acting between the coupling elements and the guide paths of damper mass carrier and damper masses are directed toward one another independent from the respective deflection angle in order to obtain a plurality of path points for the guide paths in damper mass carrier and damper masses, wherein the plurality of path points differ from one another with respect to their radii and, by connecting to one another, form a polygonal chain by path curve segments that are strung together.

2. The mass damper system according to claim 1, wherein when the ratio value is 1, the guide paths in the damper mass carrier and in the damper masses are aligned with respect to the damper mass carrier and the damper masses such that their respective centerlines cross the central axis of the damper mass carrier.

3. Mass damper system according to claim 1, wherein when the ratio value is not equal to 1 but is greater than zero, the guide paths in the damper mass carrier and in the damper masses are aligned with respect to the damper mass carrier and the damper masses such that their respective centerlines miss the central axis of the damper mass carrier.

4. A method for configuring a geometry of guide paths at a damper mass carrier of a mass damper system, wherein the damper mass carrier receives damper masses, wherein the method comprises:
   a) initiating a swiveling movement at the respective damper mass by a swiveling angle around a center of mass through the guide paths of the damper mass carrier and the damper mass when the damper masses are deflected by a deflection angle from an initial position;
   b) geometric configuration of the guide paths and a geometric configuration of a path curve of the center of mass of the respective damper mass in association with one another;
   c) geometric configuration of the guide paths using string lengths of imaginary string pendulums which result during the deflection of the respective damper mass from the initial position by a deflection angle, and predetermination of the position of the respective coupling element;
   d) geometric configuration of the path curve of the center of mass of each respective damper mass based on a first radial portion and a second radial portion, wherein an extension length from a central axis of the damper mass carrier to a connection point of the second radial portion is associated with the first radial portion, wherein the first radial portion executes movements along an oscillation angle of the respective damper mass around the central axis, wherein an extension length from the connection point at the first radial portion to the center of mass of each respective damper mass is associated with the second radial portion, wherein the second radial portion executes movements along a deflection angle around the connection point at the first radial portion,
   e) specifying a ratio value diverging from zero which is determined from the swiveling angle of the respective damper mass in relation to its oscillation angle;
   f) determining the position of the respective coupling element in relation to the string length of the imaginary string pendulum associated with the respective is coupling element through selection of that location along the string length at which the position of the respective coupling element at the respective imaginary string pendulum remains unchanged over the deflection angle and at which contact forces acting between the coupling elements and the guide paths of the damper mass carrier and the damper masses are directed toward one another independent from the respective deflection angle in order to obtain a plurality of path points for the guide paths in the damper mass carrier and the damper masses, which path points differ from one another with respect to their radii; and
   g) connecting the plurality of path points for the guide paths to one another to form a polygonal chain by path curve segments which are strung together f) coupling the damper masses with the damper mass carrier by coupling elements operative communicated by the guide paths according to steps a) through g).

5. The method according to claim 4, wherein when the ratio value is 1, the guide paths in the damper mass carrier and in the damper masses are aligned with respect to the damper mass carrier and the damper masses such that their respective centerlines cross the central axis of the damper mass carrier.

6. The method according to claim 4, wherein when the ratio value is not equal to 1 but is greater than zero, the guide paths in the damper mass carrier and in the damper masses are aligned with respect to the damper mass carrier and the damper masses such that their respective centerlines miss the central axis of the damper mass carrier.

7. A mass damper system comprising:
   damper masses having guide paths;
   coupling elements;
   a damper mass carrier which has guide paths for receiving the damper masses, the guide paths being connected to the guide paths of the damper masses by the coupling elements,
   wherein the guide paths of the damper mass carrier and the damper mass initiate a swiveling movement at the respective damper mass by a swiveling angle around a center of mass when the damper masses are deflected by a deflection angle from an initial position due to centrifugal force,
   wherein the guide paths and a geometric configuration of a path curve of the center of mass of the respective damper mass are carried out in association with one another,
   wherein string lengths of imaginary string pendulums which result during the deflection of the respective damper mass from the initial position by a deflection angle are used for the geometric configuration of the guide paths,
   wherein the path curve of the center of mass of the respective damper mass is described by a first radial portion and second radial portion, there being associated with the first radial portion an extension length from a central axis of the damper mass carrier to a connection point of the second radial portion, and the first radial portion executes movements along an oscillation angle of the respective damper mass around the central axis, while an extension length from the connection point at the first radial portion to the center of mass of the respective damper mass is associated with the second radial portion, and the second radial portion executes movements along a deflection angle around the connection point at the first radial portion,
   wherein the guide paths in damper mass carrier elements of damper mass carrier and in damper masses are made up, respectively, of different circle segments with different radii,
   wherein the different circle segments are configured such that by varying lengths and of imaginary string pendulums during the deflection from the deflection position over a deflection angle that the course of the path curve of the center of mass of the damper masses corresponds at least substantially to the course of a target path curve.

* * * * *